(12) United States Patent
Kayama et al.

(10) Patent No.: US 8,354,358 B2
(45) Date of Patent: Jan. 15, 2013

(54) FINE PARTICULATE TITANIUM DIOXIDE, AND PRODUCTION PROCESS AND USES THEREOF

(75) Inventors: Susumu Kayama, Toyama (JP); Hisao Kogoi, Toyama (JP)

(73) Assignee: Showa Denko K.K., Tokyo (JP)

( * ) Notice: Subject to any disclaimer, the term of this patent is extended or adjusted under 35 U.S.C. 154(b) by 612 days.

(21) Appl. No.: 11/883,749

(22) PCT Filed: Feb. 28, 2006

(86) PCT No.: PCT/JP2006/304205
§ 371 (c)(1),
(2), (4) Date: Aug. 6, 2007

(87) PCT Pub. No.: WO2006/098175
PCT Pub. Date: Sep. 21, 2006

(65) Prior Publication Data
US 2008/0112880 A1 May 15, 2008

Related U.S. Application Data

(60) Provisional application No. 60/659,100, filed on Mar. 8, 2005.

(30) Foreign Application Priority Data

Feb. 28, 2005  (JP) ................... 2005-054666

(51) Int. Cl.
*B01J 23/00* (2006.01)
(52) U.S. Cl. ...................................... 502/350
(58) Field of Classification Search .................. 423/610, 423/613
See application file for complete search history.

(56) References Cited

U.S. PATENT DOCUMENTS

| | | | | |
|---|---|---|---|---|
| 4,083,946 A | * | 4/1978 | Schurr et al. | 423/613 |
| 6,300,559 B1 | | 10/2001 | Ohmori | |
| 6,544,493 B1 | | 4/2003 | Tanaka et al. | |
| 6,824,758 B2 | | 11/2004 | Tanaka et al. | |
| 2002/0106321 A1 | | 8/2002 | Tanaka et al. | |
| 2003/0082099 A1 | * | 5/2003 | Tanaka et al. | 423/613 |
| 2005/0076811 A1 | * | 4/2005 | Kayama et al. | 106/437 |
| 2005/0271578 A1 | * | 12/2005 | Terada et al. | 423/610 |
| 2007/0081938 A1 | * | 4/2007 | Sakai | 423/610 |

FOREIGN PATENT DOCUMENTS

| | | |
|---|---|---|
| EP | 1 667 255 A1 | 6/2006 |
| JP | 2-44766 B2 | 10/1990 |
| JP | 3-252315 A | 11/1991 |
| JP | 6-340423 A | 12/1994 |
| JP | 10-255863 A | 9/1998 |
| JP | 2000-340269 A | 12/2000 |
| JP | 2003-327432 A | 11/2003 |
| JP | 2003327432 A * | 11/2003 |
| JP | 2004-331427 A | 11/2004 |
| WO | WO 01/16027 A1 | 3/2001 |
| WO | WO 01/23305 * | 4/2001 |
| WO | WO 01/23305 A1 | 4/2001 |
| WO | WO 03/074426 * | 9/2003 |
| WO | WO 2004063431 A1 * | 7/2004 |
| WO | 2005/029614 A1 | 3/2005 |
| WO | WO 2005033009 A1 * | 4/2005 |

OTHER PUBLICATIONS

"Hikari Clean Kakumei" (Light Clean Revolution), 1997, pp. 143-145, CMC.
K. Hashimoto et al., "Sannka Titan Hikaki Shokubai no Subete" (All about Titanium Oxide Photocatalysis), 1998, pp. 29-30, CMC.
Brian O'Regan et al., "A low-cost, high efficiency solar cell based on dye-sensitized colloidal $TiO_2$ films", Nature, Oct. 24, 1991, p. 737-740, vol. 353, No. 6346.
M. Kiyono, "Sannka Titan"(Titanium Oxide), 1991, pp. 54 and 129, vol. 54, Gihodo Co.
S. Saito et al., "Chobiryushi Handbook" (Ultrafine Particle Handbook), 1990, p. 388, Fujitec Corp.
"Ceramic Kogaku Handbook" (Ceramic Engineering Handbook), Apr. 10, 1989, pp. 596-598, Nippon Ceramics Kyokai, $1^{st}$ ed.
Suyama et al., "TiO2 Produced by Vapor-Phase Oxygenolysis of TiCl4", J Amer Ceramic Soc, Vol, 59, No. 3-4, 1976, pp. 146-149.

* cited by examiner

*Primary Examiner* — Emily Le
*Assistant Examiner* — Michael Forrest
(74) *Attorney, Agent, or Firm* — Sughrue Mion, PLLC

(57) ABSTRACT

Titanium dioxide having a ratio $D_{top}/D_{50}$ of 1 to 3, between the maximum particle diameter $D_{top}$ and the average particle diameter $D_{50}$, as determined based on observing the primary particles by a field emission-type scanning electron microscope. A production process of the titanium dioxide comprises performing a vapor phase process of reacting a titanium tetrachloride-containing gas with an oxidative gas to produce titanium dioxide, wherein when the titanium tetrachloride-containing gas and the oxidative gas are reacted by introducing each gas into a reaction tube, the temperature in the reaction tube is from 1,050 to less than 1,300° C.

17 Claims, 2 Drawing Sheets

FINE PARTICULATE TITANIUM DIOXIDE, AND PRODUCTION PROCESS AND USES THEREOF

CROSS REFERENCE TO RELATED APPLICATIONS

This application is an application filed under 35 U.S.C. §111(a) claiming benefit pursuant to 35 U.S.C. §119(e)(1) of the filing date of the Provisional Application No. 60/659,100 filed on Mar. 8, 2005, pursuant to 35 U.S.C. §111(b). This application also claims a priority under 35 U.S.C. §119(b) based on Japanese Patent Application No. 2005-054,666 filed on Feb. 28, 2005 and the disclosure thereof is incorporated herein by reference thereto.

TECHNICAL FIELD

The present invention relates to ultrafine particulate titanium dioxide, which is useful, for example, as an additive to a photocatalyst, a solar cell or a silicone rubber or as a dielectric material, and also relates to a production process and the uses thereof.

BACKGROUND ART

Ultrafine particulate titanium dioxide has been used in a wide range of applications and, for example, as an additive to an ultraviolet-shielding material or a silicone rubber, or as a dielectric raw material or a cosmetic material (the term "titanium oxide" is widely used as a common name and therefore, in the present invention, all titanium dioxides simply referred to as titanium oxide are collectively called "titanium dioxide" or "titanium oxide"). The titanium dioxide is also used as a photocatalyst, a solar cell or the like.

As for the crystal form of titanium dioxide, three types, rutile, anatase and brookite, are available and, among these, anatase or brookite titanium dioxide are excellent in photo-electrochemical activity as compared with rutile titanium dioxide and are used in photocatalysts or solar cells.

The photocatalytic activity of titanium dioxide is utilized for the decomposition of an organic material, such as in an antimicrobial tile, a self-cleaning building material and deodorant fibers, and the mechanism thereof is understood to be as follows. The titanium dioxide absorbs ultraviolet rays to generate an electron and a hole in the inside thereof. The hole reacts with the adsorbed water of titanium dioxide to produce a hydroxy radical and by the effect of this radical, the organic material adsorbed on the titanium dioxide particle surface is decomposed into carbonic acid gas or water (Akira Fujishima, Kazuhito Hashimoto and Toshiya Watanabe, *Hikari Clean Kakumei* (*Light Clean Revolution*), pp. 143-145, CMS (1997)). That is, the conditions required for the titanium dioxide having a strong photocatalytic activity are to readily generate a hole and to allow the hole to easily reach the titanium dioxide surface. In Kazuhito Hashimoto and Akira Fujishima (compilers), *Sannka Titan Hikari Shokubai no Subete* (*All About Titanium Oxide Photocatalyst*), pp. 29-30, CMC (1998), anatase titanium dioxide, titanium dioxide with a small number of lattice defects, and titanium dioxide of a small particle size and having a large specific surface area are described as the titanium dioxides having a high photocatalytic activity.

As for the application to a solar cell, a dye-sensitized solar cell comprising a combination of titanium dioxide with a ruthenium-based dye was reported in 1991 by Graetzel et al. of EPFL-Lausanne and since this discovery, studies have been made thereon (M. Graetzel, *Nature*, 353, 737 (1991)). In the dye-sensitized solar cell, the titanium dioxide plays the role of a support for the dye as well as an n-type semiconductor and is used as a dye electrode bound to an electrically conducting glass electrode. The dye-sensitized solar cell has a structure that an electrolytic layer is interposed between a dye electrode and a counter electrode, where the dye absorbs light and thereby generates an electron and a hole. The electron generated penetrates through the titanium dioxide layer to reach the electrically conducting glass electrode through and is taken outside. On the other hand, the hole generated is transferred to the counter electrode through the electrolytic layer and combines with an electron supplied through the electrically conducting glass electrode. One of the factors for elevating the characteristic feature of a dye-sensitized solar cell is that the titanium dioxide and the dye are easily combined. As for the crystal form of titanium dioxide which can easily combine with the dye, for example, JP-A-10-255863 describes use of an anatase type, and JP-A-2000-340269 states that the brookite type is suitable for a dye-sensitized solar cell.

In the light of bringing out the function of titanium dioxide, good dispersibility is important. For example, when the titanium dioxide is used as a photocatalyst, if the dispersibility is bad, the covering property is intensified and the applicable usage is restricted. The titanium dioxide having poor dispersibility transmits light less and, therefore, also in the field of solar cell, the titanium dioxide capable of contributing to the light absorption is limited and the photoelectric conversion efficiency is decreased. In general, it is considered that light scattering (covering power) becomes maximum when the particle diameter is about a half of the visible light wavelength, and as the particle size becomes smaller, the light scattering is weakened (Manabu Kiyono, *Sannka Titan* (*Titanium Oxide*), p. 129, Gihodo (1991)). The primary particle diameter of the titanium dioxide used in the above-described field is from several nm to tens of nm in many cases and therefore, as long as the dispersibility is good, the effect on the light scattering is small. If the titanium dioxide has poor dispersibility and gives an aggregated particle having a large diameter, light scattering is intensified.

SUMMARY OF THE INVENTION

For example, when the dielectric material is barium titanate, the raw material used in the solid phase method or sol-gel method, which are a representative synthesis method, is titanium dioxide. The reaction in such a method is said to proceed by the migration of a barium source to a titanium dioxide particle, but if the primary particle diameter of the titanium dioxide is non-uniform, the reaction time differs depending on the size of the particle diameter, and the obtained barium titanate also becomes non-uniform in view of particle diameter or quality.

Therefore, in the case of using titanium dioxide as a dielectric raw material, uniformity of the primary particle diameter is important in addition to the dispersibility.

In the case of using titanium dioxide for a photo-catalyst or a solar cell or as a dielectric raw material, when a corrosive component such as chlorine is present, this may cause corrosion or deterioration of the substrate. Therefore, the chlorine content of titanium dioxide is preferably low. Furthermore, the content of Fe, Al, Si, S or the like is also preferably low. In the application to a dielectric raw material, presence of impurities may affect the dielectric properties and is preferably avoided as much as possible. In the application to a photo-catalyst or a solar cell, for example, titanium dioxide containing Fe gives rise to coloration and is not suitable for usage where transparency is required. Also, titanium dioxide having a large content of a component such as Al and S may cause generation of a lattice defect, and the function as a photocatalyst or a solar cell may be decreased.

The production processes of titanium dioxide are roughly classified into a liquid phase process of hydrolyzing titanium tetrachloride or titanyl sulfate, and a vapor phase process of reacting titanium tetrachloride with an oxidative gas such as oxygen or water vapor. According to the liquid phase process, titanium dioxide comprising anatase as the main phase can be obtained but this titanium dioxide is inevitably in a sol or slurry state. When titanium dioxide is used in this state, the application is limited. In order to use the titanium dioxide as a powder, drying is necessary but it is said that ultrafine particles wetted with a solvent generally undergo intensive aggregation as the drying proceeds (Shinroku Saito (supervisor), *Chobiryushi Handbook (Ultrafine Particle Handbook)*, p. 388, Fujitec Corp. (1990)). In the case of using this titanium dioxide for a photo-catalyst or the like, the titanium oxide must be strongly cracked or ground so as to elevate the dispersibility, and this may cause a problem such as mingling of abraded matter attributable to the grinding treatment or the like, or non-uniformity in the particle size distribution.

On the other hand, titanium dioxide made by a vapor phase process is considered to exhibit excellent dispersibility as compared with that obtained by a liquid phase process, because a solvent is not used. Further, by virtue of high temperature at the synthesis, titanium dioxide by a vapor phase process characteristically has excellent crystallinity as compared with titanium dioxide by a liquid phase process.

A large number of methods are known for obtaining ultrafine particulate titanium dioxide by a vapor phase process. For example, JP-A-6-340423 discloses a method of producing titanium dioxide by hydrolyzing titanium tetrachloride in a flame, wherein the reaction is performed by adjusting the molar ratio of oxygen, titanium tetra-chloride and hydrogen to obtain titanium dioxide having a high rutile content by percentage. JP-A-7-316536 discloses a method of producing a crystalline titanium dioxide powder by hydrolyzing titanium tetrachloride in a high-temperature vapor phase and rapidly cooling the reaction product, wherein the flame temperature and the titanium concentration in the raw material gas are specified to obtain a crystalline transparent titanium dioxide having an average primary particle diameter of 40 to 150 nm.

As for the method of producing titanium dioxide comprising anatase as the main phase by a vapor phase process, for example, JP-A-10-251021 discloses a production method of adjusting the rutile content ratio by changing the ratio of hydrogen in a oxygen/hydrogen mixed gas in the vapor phase reaction, and titanium dioxide having a rutile content of 9% is described. However, the titanium dioxide has a high rutile content ratio or a large primary particle diameter in any case and is not suitably used for a photocatalyst or a solar cell. Furthermore, the primary particle diameter uniformity and particle size distribution are not described.

When titanium dioxide is produced by a vapor phase process using titanium tetrachloride as the raw material, ultrafine particles may be readily obtained but, as chlorine originating in the raw material remains in the titanium dioxide, dechlorination by heating, water washing or the like is required in many cases. However, in the case of ultrafine particulate titanium dioxide, sintering of particles with each other proceeds due to heating for the chlorine reduction and, as a result, the specific surface area readily decreases and transition of crystal form from anatase to rutile may occur. For preventing a reduction in the specific surface area and transition of the crystal form, heating must be performed at a low temperature or in a short time, but sufficient dechlorination may not be obtained. The method for the chlorine reduction of ultrafine particulate titanium dioxide is disclosed, for example, in JP-A-10-251021. This method is a method of contacting titanium dioxide with water vapor while rolling the titanium dioxide in a cylindrical rotary heating furnace, thereby decreasing the chlorine content. The rutile content of the titanium dioxide described here is as high as 15%.

On the other hand, in the dechlorination by water washing or the like, chlorine remaining on the titanium dioxide particle surface may be removed, but chlorine inside the particle can be hardly contacted with water and the internal chlorine is disadvantageously liable to remain.

As described above, in the conventional vapor phase process, a low rutile content-type ultrafine particulate titanium dioxide having a uniform primary particle diameter and a low chlorine content cannot be obtained.

The present invention has been made to solve the above-described problems, and an object of the present invention is to provide ultrafine particulate titanium dioxide suitable for photocatalysts, solar cells, silicone rubber additives, dielectric applications and the like, and a production process thereof.

As a result of intensive studies to solve those problems, the present inventors have found that production of a titanium dioxide having excellent primary particle diameter uniformity and preferably a low chlorine content can attain the above object.

That is, the present invention comprises the following inventions.

(1) Titanium dioxide having a ratio $D_{top}/D_{50}$ of 1 to 3, between the maximum particle diameter $D_{top}$ and the average particle diameter $D_{50}$, wherein the $D_{top}$ and $D_{50}$ are determined based on observing the primary particles by a field emission-type scanning electron microscope.

(2) The titanium dioxide as described in (1), wherein the $D_{top}/D_{50}$ is from 1 to 2.

(3) The titanium dioxide as described in (1) or (2), wherein the $D_{50}$ is from 5 to 200 nm.

(4) The titanium dioxide as described in any one of (1) to (3), wherein the titanium dioxide has a chlorine content of 0.001 mass % to 0.2 mass %.

(5) The titanium dioxide as described in any one of (1) to (4), wherein the content of each of the elements Si, Al, Fe and S in the titanium dioxide is 0.0001 mass % to 0.01 mass %.

(6) The titanium dioxide as described in any one of (1) to (5), wherein the anatase content of the titanium dioxide is 50% or more.

(7) The titanium dioxide as described in (6), wherein the anatase content is 60% or more.

(8) The titanium dioxide as described in (7), wherein the anatase content by percentage is 90% or more.

(9) The titanium dioxide as described in any one of (1) to (8), wherein in the particle size distribution of primary particles observed by a field emission-type scanning electron microscope, the distribution constant n according to the following Rosin-Rammler formula is 3 or more:

$$R=100\exp(-bD^n)$$

(wherein D is a particle diameter, R is a percentage of the number of particles larger than D (particle diameter) based on the number of all particles, and n is a distribution constant).

(10) A process for producing the titanium dioxide described in any one of (1) to (9), the process comprising performing a vapor phase process of reacting a titanium tetrachloride-containing gas with an oxidative gas to produce titanium dioxide, wherein when the titanium tetrachloride-containing gas and the oxidative gas are reacted by introducing each gas into a reaction tube, the temperature in the reaction tube is from 1,050 to less than 1,300° C.

(11) The production process of titanium dioxide as described in (10), wherein in the introduction of the titanium tetrachloride-containing gas and the oxidative gas into the reaction tube, the ratio (S1/S2) of the cross-sectional area (S1) of the reaction tube and the sum total (S2) of cross-sectional areas of the inlet tubes for the titanium tetrachloride-containing gas and the oxidative gas is from 1 to 2.5.

(12) The production process of titanium dioxide as described in (ii), wherein the ratio S1/S2 is from 1 to 1.5.

(13) The production process of titanium dioxide as described in any one of (10) to (12), wherein in the synthesis of titanium dioxide by the vapor phase process, the titanium dioxide produced by the reaction of titanium tetrachloride with the oxidative gas stays in the reaction tube for an average residence time of 0.005 to 0.08 seconds.

(14) The production process of titanium dioxide as described in any one of (10) to (13), wherein in the synthesis of titanium dioxide by the vapor phase process, the flow rate of each of the titanium tetrachloride-containing gas and the oxidative gas at the inlet part into the reaction tube is from 30 to 150 m/s.

(15) The production process of titanium dioxide as described in any one of (10) to (14), wherein the titanium tetrachloride-containing gas and the oxidative gas each is preheated at 600° C. to less than 1,200° C. and then introduced into the reaction tube.

(16) The production process of titanium dioxide as described in any one of (10) to (15), wherein the reaction is performed between a raw material gas prepared by mixing an inert gas at a ratio of 100 mol or less per mol of titanium tetrachloride and an oxidative gas in an amount of 1 to 150 equivalents per mol of titanium tetrachloride.

(17) The production process of titanium dioxide as described in any one of (10) to (16), wherein the oxidative gas is a water vapor-containing oxygen gas.

(18) The production process of titanium dioxide as described in (17), wherein the oxidative gas contains 0.1 mol or more of water vapor per mol of oxygen gas.

(19) The production process of titanium dioxide as described in any one of (10) to (18), wherein the titanium dioxide is dechlorinated by a dry dechlorination method to obtain titanium dioxide having a chlorine content of 0.2 mass % or less.

(20) The production process of titanium dioxide as described in (19), wherein the dry dechlorination method is a method of heating the titanium dioxide at 200 to 550° C.

(21) The production process of titanium dioxide as described in (19) or (20), wherein the dry dechlorination method is a method of heating a water vapor-containing gas at 200 to 1,000° C. while contacting the gas with the titanium dioxide.

(22) The production process of titanium dioxide as described in (20) or (21), wherein the amount of the water vapor is, in terms of mass ratio, 0.01 to 1 based on the titanium dioxide.

(23) The production process of titanium dioxide as described in (21) or (22), wherein the water vapor-containing gas is an air containing 0.1 vol % or more of water vapor.

(24) The production process of titanium dioxide as described in any one of (19) to (23), wherein in the dry dechlorination method, the dechlorination of the titanium dioxide is performed in a vessel under reduced pressure.

(25) The production process of titanium dioxide as described in (24), wherein the pressure reduction degree inside the vessel under reduced pressure is 0.5 kPa or more.

(26) The production process of titanium dioxide as described in any one of (10) to (25), wherein the titanium dioxide is dechlorinated by a wet dechlorination method to obtain a slurry containing titanium dioxide having a chlorine content of 0.2 mass % or less.

(27) The production process of titanium dioxide as described in (26), wherein the wet dechlorination method is a method of suspending the titanium dioxide in water to transfer chlorine to a liquid phase and separating the chlorine transferred to the liquid phase out of the system.

(28) The production process of titanium dioxide as described in (26) or (27), wherein the wet dechlorination method is a method of performing the separation of chlorine by using an ultrafiltration membrane.

(29) The production process of titanium dioxide as described in (26) or (27), wherein the wet dechlorination method is a method of performing the separation of chlorine by using a reverse osmosis membrane.

(30) The production process of titanium dioxide as described in (26) or (27), wherein the wet dechlorination method is a method of performing the separation of chlorine by using a filter press.

(31) A slurry comprising the titanium dioxide described in any one of (1) to (9).

(32) A composition comprising the titanium dioxide described in any one of (1) to (9).

(33) A photocatalytic material comprising the titanium dioxide described in any one of (1) to (9).

(34) A wet solar cell material comprising the titanium dioxide described in any one of (1) to (9).

(35) A dielectric raw material comprising the titanium dioxide described in any one of (1) to (9).

(36) A silicone rubber additive comprising the titanium dioxide described in any one of (1) to (9).

(37) A cosmetic material comprising the titanium dioxide described in any one of (1) to (9).

(38) A fuel cell catalyst comprising the titanium dioxide as described in any one of (1) to (9).

(39) A fuel cell comprising the fuel cell catalyst as described in (38).

(40) A power generator, computer, mobile electronic device or automobile comprising the fuel cell as described in (39).

(41) An electronic paper comprising the titanium dioxide as described in any one of (1) to (9).

(42) A display, clock, mobile electronic device, computer, IC card, USB memory, advertisement medium, house electric equipment or toy comprising the electronic paper as described in (41).

According to the present invention, ultrafine particulate titanium dioxide (fine particles having a primary particle size of about 0.1 μm or less is generally referred to as "ultra-fine particle") suitable for uses such as solar cells, photocatalysts, dielectric raw material, fuel cells and electronic papers, and a production process thereof are provided.

MODES FOR CARRYING OUT THE INVENTION

In the titanium dioxide according to a preferred embodiment of the present invention, the ratio $D_{top}/D_{50}$ between the maximum particle diameter $D_{top}$ and the average particle diameter $D_{50}$ as determined by observing the primary particles by a field emission-type scanning electron microscope is from 1 to 3, preferably from 1 to less than 3, more preferably from 1 to 2.

Figure 1:
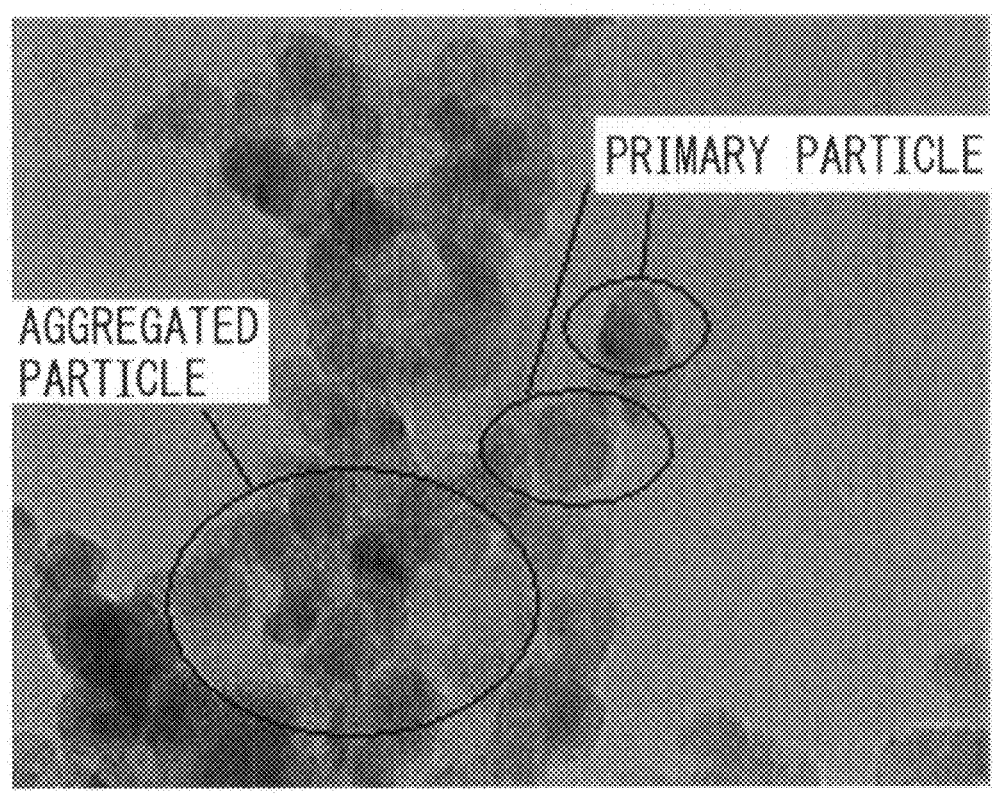
FIG. 1 shows examples of the primary particle and the aggregated particle of titanium dioxide.

The primary particle as used herein means an aggregate where one or more crystallite takes an inter-growth structure, and is different from a secondary aggregated particle (see, Kiichiro Kubo et al. (compilers), *Funtai (Powder)*, pp. 73-74, Maruzen (1970)). FIG. 1 shows examples of the primary particle and the secondary aggregated particle of titanium dioxide.

The method for measuring $D_{top}$ and $D_{50}$ by a field emission-type scanning electron microscope is described below.

An image of an objective sample is photographed by a field emission-type scanning electron microscope to have from about 200 to 300 primary particles per one visual field, and the primary particle diameter of each particle is determined for about 200 to 300 particles in the image by an image analysis software. As for the image analysis software, for example, Particle Analysis Ver. 3 produced by Sumitomo Metal Technology Inc. may be used. Another viewing field of the same sample is subjected to the same operation, and this operation is repeated until the total number of particles used for the calculation of the primary particle diameter exceeds at least 1,000. The average particle diameter ($D_{50}$) and the maximum particle diameter ($D_{top}$) are calculated from the results obtained, and $D_{top}/D_{50}$ is determined.

A smaller $D_{top}/D_{50}$ value reveals that the particle size distribution on the coarse particle side is narrower. Therefore, it is understood that the titanium dioxide of the present invention has a narrower particle size distribution on the coarse particle side in comparison with commercially available titanium dioxide.

As an index for showing the entire uniformity of particle size, a method of specifying the distribution constant (n) by using a Rosin-Rammler formula is known. The Rosin-Rammler formula is briefly described below, but details thereof are described in *Ceramic Kogaku Handbook (Ceramic Engineering Handbook)*, compiled by Nippon Ceramics Kyokai, 1st ed., pp. 596-598.

The Rosin-Rammler formula is represented by the following formula (1):

$$R=100\exp(-bD^n) \quad (1)$$

wherein D is a particle diameter, R is a percentage of the number of particles larger than D (particle diameter) based on the number of all particles, and n is a distribution constant.

Assuming that $b=1/D_e^n$, formula (1) can be rewritten as follows:

$$R=100\exp\{-(D/D_e)^n\} \quad (2)$$

wherein $D_e$ is a particle size characteristic number.

From formula (1) or (2), the following formula (3) is obtained:

$$\log\{\log(100/R)\}=n\log D+C \quad (3)$$

wherein C is a constant. From formula (3), when the relationship between logD and log{log(100/R)} is plotted on the Rosin-Rammler (RR) chart where logD is graduated on the x axis and log{log(100/R)} on the y axis, a nearly straight line is obtained. The gradient (n) of this straight line indicates the degree of uniformity of the grain size. As the numerical value of n is larger, the uniformity of grain size is judged to be higher.

In the fine particulate titanium dioxide of a preferable embodiment of the present invention, the distribution constant n according to the Rosin-Rammler formula is preferably 3 or more, more preferably 3 to 5.

In the present invention, the titanium dioxide comprises anatase as the main phase, and the anatase content is 50% or more, preferably 60% to 100%, more preferably 90% to 100%.

The anatase content by percentage is indicated by a ratio (=100×Ha/(Hr+Ha)) calculated from the peak height corresponding to the anatase crystal (this peak height is simply referred to as "Ha") in the X-ray diffraction and the peak height corresponding to the rutile crystal (this peak height is simply referred to as "Hr"). For example, in a powder X-ray diffraction, the spacing between the planes, d, can be calculated from the diffraction angle of Cu—Kα1 ray, by using a peak of 2.38 Å for anatase crystal and 3.25 Å for rutile crystal.

The titanium dioxide of the present invention preferably has a primary particle diameter of 5 to 200 nm, more preferably from 10 to 100 nm, as determined by a field emission-type scanning electron microscope.

If the primary particle diameter is less than 5 nm, the titanium dioxide has low crystallinity in many cases and therefore, can be hardly used for a photocatalyst, a solar cell or a dielectric raw material. The upper limit of the primary particle diameter is not particularly limited, but judging from suitability in the above-described application fields and experiences in uses, the appropriate upper limit is 200 nm.

The titanium dioxide in the present invention preferably has a chlorine content of 0.2 mass % or less, more preferably 0.1 mass % or less.

Also, the content of each of Fe, Al, Si and S is preferably 0.01 mass % or less. The lower limit is not particularly restricted, but is preferably 0.001 mass % from the production cost.

In the case of using the titanium dioxide as a dielectric raw material, the mixing ratio of barium source and titanium dioxide at the synthesis of a dielectric material must be strictly controlled, but if the content of chlorine contained in the titanium dioxide exceeds 0.2 mass %, there may arise serious fluctuation in the compositional ratio of the obtained barium titanate. Also, if the content of each of Fe, Si, Al and S exceeds 0.01 mass %, this may not only cause fluctuation in the mixing ratio between titanium dioxide and barium source but also greatly affect the dielectric characteristics. The lower limit is not particularly restricted, but is preferably 0.0001 mass % from the production cost.

The ultrafine particulate titanium dioxide in the present invention may be contained as a raw material of various compositions or as a particle component of exerting the pigment or photocatalytic effect and can be utilized as a raw material or additive of various products such as cosmetic material, ultraviolet-shielding material, dielectric material, silicone rubber dye sensitized solar cell, electronic paper and fuel cell catalyst.

The fuel cell comprising the fuel cell catalyst can be used in various power generators, computer, mobile electronic devices such as cellular phone and PDA or fuel cell automobiles. Furthermore, an electronic paper, using a microcapsule for an electronic paper of a preferable embodiment in the present invention can be used, for example, in various displays, clock or watch display, mobile electronic devices such as cellular phone, PDA and book-reading terminal, computer, electronic money, cards such as IC card, displays for a USB memory or the like, advertisement media such as a train window advertisement or an advertising poster in a train, a rear-side display of a cellular phone or a mobile viewer, house electric equipment and toys.

Figure 2:
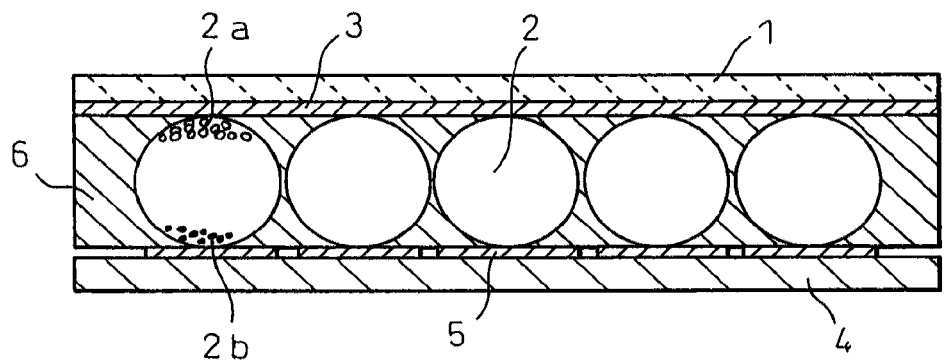
FIG. 2 is a schematic cross-sectional view of an electronic paper.

In the case of using as an electronic paper, the titanium dioxide in the present invention is useful, for example, as white particles in a particle move-type structure wherein white and black particles are moved up and down by on an electric field so as to change the display color (for example, a microcapsule-type structure wherein white and black particles encapsulated in microcapsules are moved up and down). FIG. 2 is a cross-sectional view of an electronic paper and schematically shows the structure of a typical electronic paper, in which reference number 1 denotes a transparent substrate, 2 microcapsules, 2a white particles, 2b black particles, 3 an electrically conducting layer, 4 a rear-side substrate, 5 an electrode and 6 a fixing layer.

In the case of using as a dielectric raw material, titanium dioxide is mixed with a barium source such as barium carbonate and calcined to form titanium barium, and if the primary particle size of the titanium dioxide is not uniform, the obtainable barium titanate is also not uniform in its primary particle size, resulting in non-uniform dielectric characteristic. However, when the titanium dioxide of the present invention, having a uniform primary particle size, is used as a raw material, barium titanate with a uniform dielectric characteristic can be obtained.

In a dye sensitizing-type solar cell, where titanium dioxide is used as a support for a dye, the non-uniformity of the primary particle size of titanium dioxide may cause in a non-uniformity in dye adsorption, causing degrading in solar cell performance.

The production process is described below.

The production process of titanium dioxide in general by a vapor phase process is known, and when titanium tetrachloride is oxidized by using an oxidative gas such as oxygen or water vapor under the reaction condition of about 1,000° C., fine particulate titanium dioxide is obtained.

In the synthesis of titanium dioxide by a vapor phase process, titanium tetrachloride as the raw material and an oxidative gas are mixed in a reaction tube and reacted to produce a titanium dioxide nucleus, and the nucleus undergoes particle growth to a primary particle. As for this particle growth, two mechanisms, that is, chemical vapor deposition (CVD) and sintering, are considered.

The particle growth by CVD is a mechanism of newly forming a titanium dioxide surface layer through a reaction of the titanium dioxide nucleus or particle surface with the raw material titanium tetrachloride, and the particle growth by sintering is a mechanism of causing collision of titanium dioxide nuclei or particles with each other to bring about coalescence through a de-hydrogen chloride-condensation reaction or dehydration-condensation reaction of an active group such as Cl group or hydroxyl group present on the nucleus or particles. These two mechanisms are considered to simultaneously proceed in parallel.

The factors having an effect on the CVD are the raw material concentration in the reaction region, the concentration of nuclei or particles produced, the temperature, and the high-temperature residence time, and elevation in the uniformity of these factors leads to the uniformalization of the primary particle diameter. For example, if the raw material concentration is not uniform, the reaction of the titanium dioxide nucleus or particle with titanium tetrachloride readily proceeds in the portion having a high titanium tetrachloride concentration, and the particle growth in this portion is accelerated. If the temperature distribution is not uniform, distribution is produced in the reaction rate according to the temperature distribution, and distribution is also produced in the particle growth rate.

The factors having an effect on the particle growth by sintering are the same as those in CVD. For example, in the portion having a high titanium dioxide nucleus or particle concentration, the possibility of causing collision of nuclei or particles with each other becomes high and sintering readily proceeds. Also, if the high-temperature residence time is long, sintering is accelerated due to elevation in the possibility of causing collision. Therefore, the high-temperature residence time is preferably made short.

More specifically, according to the present invention, in a vapor phase process of reacting a titanium tetrachloride-containing gas and an oxidative gas (high-temperature oxidation) to produce titanium dioxide, preferably, the titanium dioxide obtained by supplying a titanium tetrachloride-containing gas heated to a temperature of 600° C. to less than 1,200° C. and an oxidative gas heated to a temperature of 600° C. to less than 1,200° C. to a reaction tube and reacting these gases is allowed to stay in the reaction tube under a high-temperature condition of 1,050° C. to less than 1,300° C. for a time period of 0.005 to 0.08 seconds and then dechlorinated. The dechlorination as used herein includes a dry process and a wet process. Examples of the dry dechlorination method include a method where the titanium dioxide is heated by using a heating apparatus such as cylindrical rotary heating furnace, hot-air circulation heating furnace, fluidized drying furnace and stir-drying furnace, and chlorine is thereby removed. Incidentally, the present invention is not limited to these heating devices. Examples of the wet dechlorination method include a method of suspending titanium dioxide in pure water and separating chlorine transferred to the liquid phase out of the system. After separating chlorine out of the system, the obtained titanium dioxide may be dried.

In the present invention, the temperature in the reaction tube is preferably from 1,050 to less than 1,300° C.

The temperature in the reaction tube into which the titanium tetrachloride-containing gas or oxidative gas is introduced is preferably from 1,050° C. to less than 1,300° C., more preferably from 1,100° C. to less than 1,250° C. By elevating the temperature in the reaction tube, the reaction is completed at the same time with mixing, so that generation of uniform nuclei can be promoted and also the reaction (CVD) zone can be made small. If the temperature in the reaction tube is less than 1,050° C., titanium dioxide having a high anatase content by percentage is readily obtained but, as the reaction rate becomes insufficient, unreacted titanium tetrachloride is increased and the CVD zone is prolonged, whereas if the temperature in the reaction tube is 1,300° C. or more, transition to rutile or particle growth by sintering proceeds, as a result, the anatase content by percentage is decreased and at the same time, an ultrafine particle can hardly be obtained.

When the raw material gas is introduced to the reaction tube and the reaction proceeds, a reaction zone where the reaction temperature exceeds 1,300° C. is present, because the reaction is an exothermic reaction. Although the heat is more or less released from the apparatus, unless rapid cooling is applied, the titanium dioxide particle continues growing and the crystal form is transferred to rutile. Therefore, in the present invention, the high-temperature residence time at 1,050° C. to less than 1,300° C. is preferably set to 0.005 to 0.08 seconds, more preferably from 0.01 to 0.05 seconds. If the high-temperature residence time exceeds 0.08 seconds, transition to rutile or sintering of particles may proceed or sintering readily proceeds, whereas if it is less than 0.005 seconds, the oxidation reaction of titanium tetrachloride is insufficient, and this leads to prolongation of CVD zone or increase of residual chlorine inside the particle.

For controlling the high-temperature residence time, a method of rapidly cooling the reaction mixture is effective and, for example, a method of introducing a large amount of cooling air or gas such as nitrogen into the reaction mixture, or a method of spraying water may be employed.

The ratio (S1/S2) of the cross-sectional area (S1) of the reaction tube and the sum total (S2) of cross-sectional areas of the inlet tubes for the titanium tetrachloride-containing gas and the oxidative gas is preferably from 1 to 2.5, more preferably from 1 to 1.5.

The gases supplied from the inlet tubes are mixed and reacted in the reaction tube but for uniformly generating growth by CVD or sintering, the temperature in the reaction region or the high-temperature residence time must be nearly uniform. When the raw material gases are supplied to the reaction tube through the inlet tubes, the reaction gases are mixed while diffusing in the reaction tube. At this time, if the diffusion of the raw material gases in the vertical direction is large as compared with that in the flow direction, the raw material concentrations in the reaction region, the concentration of nuclei or particles produced, the temperature, the high-temperature residence time and the like are readily uniformalized, and this leads to non-uniformity of the primary particle diameter. In order to suppress the diffusion in the vertical direction, the ratio (S1/S2) of the cross-sectional area (S1) of the reaction tube and the sum total (S2) of cross-sectional areas of the raw material inlet tubes is preferably small. If the cross-sectional area (S1) of the reaction tube is smaller than the sum total (S2) of cross-sectional areas of the raw material inlet tubes (S1/S2<1), the flows of the raw materiala from the raw material inlet tubes to the reaction tube may be inhibited, and this may lead to residence of the raw materials in the raw material inlet tubes or breakage of the inlet tubes due to elevation of the pressure load. If the S1/S2 exceeds 2.5, the diffusion in the vertical direction comes have large effect on the gas flows and therefore, the primary particle diameter may become non-uniform. Accordingly, the titanium tetrachloride-containing gas and the oxidative gas are each preferably introduced into the reaction tube to run in the gas flow direction within the reaction tube, though it is not limited to this introduction.

Generally, from 0.1 to 4 mass % of chlorine is usually remains in the titanium dioxide obtained by a vapor phase process. The surface of anatase titanium dioxide has from 12 to 14 points/$nm^2$ allowing for bonding with chlorine or the like (see, Manabu Kiyono, *Nisannka Titan* (*Titanium Dioxide*), p. 54, supra) and when these bonding points all are chlorinated, the content of chlorine remaining on the surface of a titanium dioxide particle is theoretically represented by the following formula (4):

$$Y=0.077 \times A \quad (4)$$

(wherein Y is the content (mass %) of chlorine remaining on the surface of a titanium dioxide particle, and A is a specific surface area ($m^2$/g)). For example, the content of chlorine remaining on the surface of titanium dioxide particles having a specific surface area of 100 $m^2$/g is about 8 mass % according to formula (4).

In practice, chlorine is replaced by the oxidative gas through the reaction or undergoes equilibrium shift due to difference in the chlorine concentration between the titanium dioxide particle surface and the vapor phase and therefore, the chlorine content of titanium dioxide may be slightly lower than the value obtained according to formula (4). However, if the high-temperature residence time in the reaction is less than 0.005 seconds, it is considered that the oxidation reaction of titanium tetrachloride is not completed and the amount of titanium dioxide still in the partially chlorinated state increases. Also, when residual chlorine is left inside titanium dioxide particles, the chlorine amount inside the particles is increased and therefore, the heating treatment for the removal of chlorine must be performed at a high temperature for a long time, causing a reduction in the specific surface area. Accordingly, the ultrafine particles conventionally obtained by a vapor phase process have a high chlorine content despite a high anatase content by percentage or have a low anatase content by percentage despite a low chlorine content.

In order to set the temperature in the reaction tube to from 1,050° C. to less than 1,300° C., the heating temperatures of the raw material gases are preferably adjusted to from 600 to 1,200° C. The heated raw material gases undergo a reaction in the reaction tube and generates heat, but if the raw material gas temperatures are less than 600° C., the temperature in the reaction tube can be hardly elevated to 1,050° C. or more. Also, if the raw material temperatures exceed 1,200° C., the temperature in the reaction tube is liable to be 1,300° C. or more, despite heat dissipation from the apparatus.

As for the composition of the titanium tetrachloride-containing raw material gas, the ratio of the inert gas is preferably 100 mol or less, more preferably 80 mol or less, still more preferably 30 mol or less, per mol of the titanium tetrachloride gas. If the ratio of an inert gas is larger than this range, the reactivity and in turn, the recovery percentage as titanium dioxide decrease.

The amount of the oxidative gas reacted with the titanium tetrachloride-containing raw material gas is preferably from 2 to 150 mol, more preferably from 5 to 50 mol, per mol of titanium tetrachloride. When the amount of the oxidative gas is increased, ultrafine particles are readily obtained by virtue of increase in the number of nuclei generated and the high-temperature residence time is also reduced, so that the primary particle diameter uniformity is enhanced. Even if the amount of the oxidative gas exceeds 150 mol, this may not affect the properties of titanium dioxide and the above-described upper limit is set from an economical standpoint. On the other hand, if the amount of the oxidative gas is not sufficiently high based on titanium tetrachloride, the obtained titanium dioxide comes to have many oxygen defects and is colored. Incidentally, the oxidative gas may contain water vapor in addition to oxygen.

Dechlorination by heating of titanium dioxide is preferably performed at a heating temperature of 200 to 550° C. while contacting water vapor with the titanium dioxide powder such that the mass ratio of water and titanium dioxide (=(mass of water vapor)/(mass of titanium dioxide), hereinafter the same) becomes 0.01 or more. More preferably, the mass ratio of water and titanium dioxide is 0.04 or more, and the heating temperature is from 250 to 450° C. If the heating temperature exceeds 550° C., sintering of titanium dioxide particles proceeds and the primary particle diameter becomes non-uniform, whereas if the heating temperature is less than 200° C., the dechlorination efficiency seriously decreases. Dechlorination proceeds by causing chlorine on the titanium dioxide surface to undergo a displacement reaction with water in the vicinity of the particle or with a surface hydroxyl group of an adjacent particle. At this time, when chlorine on the titanium dioxide particle surface is replaced by water, dechlorin-ation is effected without allowing for particle growth, but when the chlorine is replaced by a surface hydroxyl group of an adjacent particle, particle growth proceeds simultaneously with dechlorination. That is, in order to attain dechlorination while suppressing the particle growth, the mass ratio of water and titanium dioxide is preferably also controlled and when the mass ratio of water and titanium dioxide is 0.01 or more, preferably 0.01 to 1, more preferably 0.05 to 2, further preferably 0.2 to 1.8 an effect of suppressing the particle growth is recognized.

The water vapor to be brought into contact with the titanium dioxide is preferably used by mixing it with a gas having a role of causing chlorine separated from titanium dioxide to efficiently move out of the system. Examples of such a gas include air. In the case of using air, the water vapor is preferably contained in the air at a concentration of 0.1 vol % or more, more preferably 5 vol % or more, still more preferably 10 vol % to 80 vol %. The water vapor-containing air is preferably heated to a temperature of 200 to 1,000° C., more preferably 450° C. to 850° C.

In the dechlorination of titanium dioxide, as for the method of causing chlorine removed from titanium dioxide to move out of the system, a method of reducing the pressure inside a vessel used for dechlorination is also effective. The pressure reduction degree inside the vessel is preferably 0.5 kPa or more, more preferably from 0.5 to 2 kPa. The pressure reduction degree as used herein means a differential pressure between the pressure in the pressure-reduced vessel and the atmospheric pressure.

Considering the emission of chlorine gas removed from titanium dioxide, a pressure reduction degree of 0.5 kPa is sufficient for the amount of titanium dioxide in the pressure-reduced vessel.

The upper limit of the pressure reduction degree is not particularly limited, but if the pressure reduction degree is elevated, a large pressure-reducing apparatus is necessary or, when a continuous dechlorination operation is performed, equipment for maintaining the pressure-reduced state and equipment for shifting the titanium dioxide from the pressure-reduced vessel to the environment in an atmosphere of air pressure are necessary, and this is economically disadvantageous. The upper limit of the pressure reduction degree not requiring a large-scale apparatus is 2 kPa.

In the fine particulate titanium dioxide according to the present invention, almost no chlorine is present inside the particle and even if it is present, most of the chlorine is particle surface chlorine removable by water washing or the like, so that the chlorine reduction can also be performed by a wet process. Examples of the wet dechlorination method include a method of suspending titanium dioxide in pure water, and separating chlorine transferred to a liquid phase out of the system by using an ultrafiltration membrane, a reverse osmosis membrane, a filter press or the like.

By virtue of high temperature at the synthesis, titanium dioxide made by a vapor phase process characteristically has excellent crystallinity as compared with titanium dioxide made by a liquid phase process. The difference in crystallinity is generally measured by an X-ray diffraction method or the like, but the difference in crystallinity between titanium dioxide made by a vapor phase process and titanium dioxide made by a liquid phase process appears prominently on the particle surface and therefore, can be hardly detected by an X-ray diffraction method. For the detection of difference in the particle surface layer, measurement of a band gap by the total light reflectance is considered effective. The method for measuring a band gap is described below.

Figure 3:
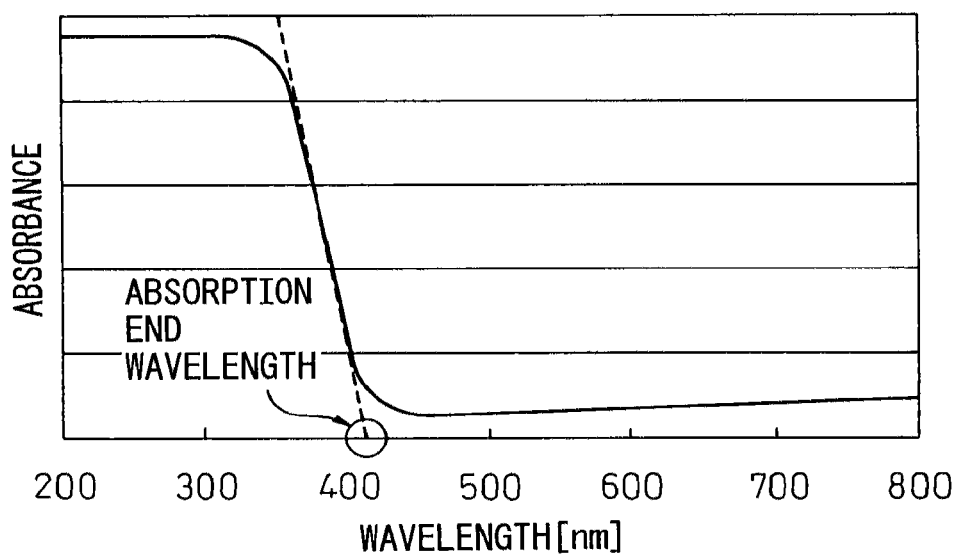
FIG. 3 shows an example of an absorbance pattern with respect to the wavelength of titanium dioxide.

The relationship between the wavelength and the absorbance is measured by using, for example, an integrating sphere-type spectrophotometer Model UV-2400 or Model IRS-240A manufactured by Shimadzu Corporation. A tangent line is drawn with respect to inflection points of the obtained absorbance pattern (see, FIG. 3) and the point (absorption end wavelength) where the tangent line and the wavelength axis are crossed is read. FIG. 3 shows one example of the relationship between the absorbance pattern and the absorption end wavelength.

The band gap (BG) is represented by:

$$E = 1240/\lambda$$

(wherein E represents the band gap [eV] and $\lambda$ represents the absorption end wavelength [nm]), and when the crystal form or particle diameter is the same, the crystallinity is lower as the BG value becomes smaller. In a preferable embodiment of the present invention, the band gap (BG) of titanium oxide is from 3 eV to 3.2 eV.

EXAMPLES

The present invention is described in greater detail below by referring to Examples and Comparative Examples, but the present invention is not limited thereto.

Example 1

A diluted titanium tetrachloride gas prepared by diluting 11.8 Nm$^3$/hr (N means a normal condition, here-inafter the same) of gaseous titanium tetrachloride with 2 Nm$^3$/hr of nitrogen gas was preheated to 1,100° C., an oxidative gas prepared by mixing 8 Nm$^3$/hr of oxygen and 32 Nm$^3$/hr of water vapor was preheated to 1,100° C., and these raw material gases were introduced into a quartz glass-made reactor where the ratio (S1/S2) of the cross-sectional area (S1) of the reaction tube and the sum total (S2) of cross-sectional areas of the inlet tubes for the titanium tetrachloride-containing gas and the oxidative gas was 1.5. After introducing a cooling air into the reaction tube so that the high-temperature residence time at 1,150° C. to less than 1,300° C. could be 0.06 second, an ultrafine particulate titanium dioxide powder was collected in a polytetrafluoroethylene-made bag filter.

The obtained titanium dioxide was passed to a cylindrical rotary heating furnace and dechlorinated at a heating temperature of 450° C. under the condition that the mass ratio of water and titanium dioxide was 0.02, as a result, $D_{50}$ of the primary particle diameter was 82 nm, $D_{top}/D_{50}$ was 2.4, the anatase content was 95%, and the chlorine content was 0.12 mass %. Also, the distribution constant n according to the Rosin-Rammler formula was 3.2. The band gap calculated from the refractive index was 3.1 eV.

The $D_{top}/D_{50}$, distribution constant n, anatase content, chlorine content, and analysis results of Fe, Al, Si and S are shown in Table 1.

Example 2

A diluted titanium tetrachloride gas prepared by diluting 5.9 Nm$^3$/hr of gaseous titanium tetrachloride with 30 Nm$^3$/hr of nitrogen gas was preheated to 1,100° C., an oxidative gas prepared by mixing 4 Nm$^3$/hr of oxygen and 16 Nm$^3$/hr of water vapor was preheated to 1,100° C., and these raw material gases were introduced into a quartz glass-made reactor where the S1/S2 was 1.0. After introducing a cooling air into the reaction tube so that the high-temperature residence time at 1,150° C. to less than 1,300° C. was be 0.04 second, an ultrafine particulate titanium dioxide powder was collected in a polytetrafluoroethylene-made bag filter.

The obtained titanium dioxide was placed in a hot-air circulation heating furnace and dechlorinated at a heating temperature of 450° C. under the condition that the mass ratio of water and titanium dioxide was 0.04, as a result, $D_{50}$ of the primary particle diameter was 21 nm, $D_{top}/D_{50}$ was 2.0, the anatase content was 91%, and the chlorine content was 0.13 mass %. Also, the distribution constant n according to the Rosin-Rammler formula was 3.5. The band gap calculated from the refractive index was 3.0 eV.

The $D_{top}/D_{50}$, distribution constant n, anatase content, BET specific surface area, chlorine content, and analysis results of Fe, Al, Si and S are shown in Table 1.

Example 3

A diluted titanium tetrachloride gas prepared by diluting 4.7 Nm$^3$/hr of gaseous titanium tetrachloride with 36 Nm$^3$/hr of nitrogen gas was preheated to 1,150° C., an oxidative gas, prepared by mixing 36 Nm$^3$/hr of air and 25 Nm$^3$/hr of water vapor, was preheated to 1,150° C., and these raw material gases were introduced into a quartz glass-made reactor where the S1/S2 ratio was 2. After introducing cooling air into the reaction tube so that the high-temperature residence time at 1,150° C. to less than 1,300° C. was 0.02 second, an ultrafine particulate titanium dioxide powder was collected by a polytetrafluoro-ethylene-made bag filter.

The obtained titanium dioxide was placed in a hot-air circulation heating furnace and dechlorinated at a heating temperature of 350° C. under the condition that the mass ratio of water and titanium dioxide was 0.06, as a result, $D_{50}$ of the primary particle diameter was 14 nm, $D_{top}/D_{50}$ was 1.9, the anatase content was 95%, and the chlorine content was 0.14 mass %. Also, the distribution constant n according to the Rosin-Rammler formula was 3.7.

The $D_{top}/D_{50}$, distribution constant n, anatase content, BET specific surface area, chlorine content, and analysis results of Fe, Al, Si and S are shown in Table 1.

Example 4

A diluted titanium tetrachloride gas prepared by diluting 11.8 Nm$^3$/hr of gaseous titanium tetrachloride with 2 Nm$^3$/hr of nitrogen gas was preheated to 1,150° C., an oxidative gas prepared by mixing 36 Nm$^3$/hr of air and 25 Nm$^3$/hr of water vapor was preheated to 1,150° C., and these raw material gases were introduced into a quartz glass-made reactor where the S1/S2 ratio was 1. After introducing a cooling air into the reaction tube so that the high-temperature residence time at 1,150° C. to less than 1,300° C. was 0.01 second, an ultrafine particulate titanium dioxide powder was collected in a polytetrafluoro-ethylene-made bag filter.

The obtained titanium dioxide was placed in a hot-air circulation heating furnace and dechlorinated at a heating temperature of 450° C. under the condition that the mass ratio of water and titanium dioxide was 0.06, as a result, $D_{50}$ of the primary particle diameter was 62 nm, $D_{top}/D_{50}$ was 2.2, the anatase content was 90%, and the chlorine content was 0.08 mass %. Also, the distribution constant n according to the Rosin-Rammler formula was 3.1.

The $D_{top}/D_{50}$, distribution constant n, anatase content, BET specific surface area, chlorine content, and analysis results of Fe, Al, Si and S are shown in Table 1.

Comparative Example 1

A diluted titanium tetrachloride gas prepared by diluting 11.8 Nm$^3$/hr of gaseous titanium tetrachloride with 8 Nm$^3$/hr of nitrogen gas was preheated to 900° C., an oxidative gas prepared by mixing 8 Nm$^3$/hr of oxygen and 32 Nm$^3$/hr of water vapor was preheated to 800° C., and these raw material gases were introduced into a quartz glass-made reactor where the S1/S2 ratio was 1.5. After introducing a cooling air into the reaction tube so that the high-temperature residence time at 1,150° C. to less than 1,300° C. was 0.2 second, an ultrafine particulate titanium dioxide powder was collected in a polytetrafluoroethylene-made bag filter.

The obtained titanium dioxide was lead to a cylindrical rotary heating furnace and dechlorinated at a heating temperature of 450° C. under the condition that the mass ratio of water and titanium dioxide was 0.02, as a result, $D_{50}$ of the primary particle diameter was 103 nm, $D_{top}/D_{50}$ was 3.4, the anatase content was 68%, and the chlorine content was 0.07 mass %. Also, the distribution constant n according to the Rosin-Rammler formula was 2.5.

The $D_{top}/D_{50}$, distribution constant n, anatase content, BET specific surface area, chlorine content, and analysis results of Fe, Al, Si and S are shown in Table 1.

Comparative Example 2

A diluted titanium tetrachloride gas prepared by diluting 4.7 Nm$^3$/hr of gaseous titanium tetrachloride with 36 Nm$^3$/hr of nitrogen gas, was preheated to 700° C., an oxidative gas, prepared by mixing 36 Nm$^3$/hr of air and 25 Nm$^3$/hr of water vapor was preheated to 700° C., and these raw material gases were introduced into a quartz glass-made reactor where the S1/S2 ratio was 1. After controlling the temperature of the reaction tube to 750° C. and introducing a cooling air into the reaction tube so as to allow for residence of the raw material gas for 0.08 second, an ultrafine particulate titanium dioxide powder was collected in a polytetrafluoroethylene-made bag filter.

The obtained titanium dioxide was placed in a hot-air circulation heating furnace and dechlorinated at a heating temperature of 350° C. under the condition that the mass ratio of water and titanium dioxide was 0.04, as a result, $D_{50}$ of the primary particle diameter was 34 nm, $D_{top}/D_{50}$ was 3.9, the anatase content was 95%, and the chlorine content was 0.22 mass %. Also, the distribution constant n according to the Rosin-Rammler formula was 2.0.

The $D_{top}/D_{50}$, distribution constant n, anatase content, BET specific surface area, chlorine content, and analysis results of Fe, Al, Si and S are shown in Table 1.

Comparative Example 3

A diluted titanium tetrachloride gas prepared by diluting 5.9 Nm$^3$/hr of gaseous titanium tetrachloride with 30 Nm$^3$/hr of nitrogen gas was preheated to 1,200° C., an oxidative gas prepared by mixing 4 Nm$^3$/hr of oxygen and 16 Nm$^3$/hr of water vapor was preheated to 1,200° C., and these raw material gases were introduced into a quartz glass-made reactor where the S1/S2 ratio was 1. After controlling the temperature of the reaction tube to 1,350° C. and introducing a cooling air into the reaction tube so as to allow residence of the raw material gas for 0.04 second, an ultrafine particulate titanium dioxide powder was collected in a polytetrafluoroethylene-made bag filter.

The obtained titanium dioxide was placed in a hot-air circulation heating furnace and dechlorinated at a heating temperature of 450° C. under the condition that the mass ratio of water and titanium dioxide was 0.06, as a result, $D_{50}$ of the primary particle diameter was 48 nm, $D_{top}/D_{50}$ was 3.3, the anatase content was 72%, and the chlorine content was 0.16 mass %. Also, the distribution constant n according to the Rosin-Rammler formula was 1.9.

The $D_{top}/D_{50}$, distribution constant n, anatase content, BET specific surface area, chlorine content, and analysis results of Fe, Al, Si and S are shown in Table 1.

Comparative Example 4

A diluted titanium tetrachloride gas prepared by diluting 5.9 Nm³/hr of gaseous titanium tetrachloride with 30 Nm³/hr of nitrogen gas was preheated to 1,200° C., an oxidative gas prepared by mixing 4 Nm³/hr of oxygen and 16 Nm³/hr of water vapor was preheated to 1,200° C., and these raw material gases were introduced into a quartz glass-made reactor where the S1/S2 ratio was 3.0. After controlling the temperature of the reaction tube to 1,350° C. and introducing cooling air into the reaction tube so as to allow for residence of the raw material gas for 0.04 second, an ultrafine particulate titanium dioxide powder was collected in a polytetrafluoroethylene-made bag filter.

The obtained titanium dioxide was placed in a hot-air circulation heating furnace and dechlorinated at a heating temperature of 450° C. under the condition that the mass ratio of water and titanium dioxide was 0.06. As a result, $D_{50}$ of the primary particle diameter was 27 nm, $D_{top}/D_{50}$ was 4.0, the anatase content was 67%, and the chlorine content was 0.06 mass %. Also, the distribution constant n according to the Rosin-Rammler formula was 1.5.

The $D_{top}/D_{50}$, distribution constant n, anatase content, BET specific surface area, chlorine content, and analysis results of Fe, Al, Si and S are shown in Table 1.

Comparative Example 5

Various physical values of commercially available titanium dioxide which is produced by a vapor phase process (P-25, produced by Nippon Aerosil Co., Ltd.) were measured. As a result, $D_{50}$ of the primary particle diameter was 29 nm, $D_{top}/D_{50}$ was 3.3, the anatase content was 76%, and the chlorine content was 0.13 mass %. Also, the distribution constant n according to the Rosin-Rammler formula was 1.3.

The $D_{top}/D_{50}$, distribution constant n, anatase content, BET specific surface area, chlorine content, and analysis results of Fe, Al, Si and S are shown in Table 1.

Comparative Example 6

An aqueous solution of titanium tetrachloride having a titanium tetrachloride concentration of 0.2 mole/L was hydrolyzed by heating with circulation at 101° C. for 1 hour, to form a ultrafine titanium dioxide sol. The obtained titanium dioxide sol was repeatedly washed with pure water and then dried at 120° C. for 12 hours in a hot air circulation-type drier. Properties of the obtained ultrafine titanium dioxide were measured to reveal that $D_{50}$ of the primary particle size was 11 nm, $D_{top}/D_{50}$ was 3.0, the anatase content was 84%, and the chlorine content was 0.13 mass %. The distribution constant according to the Rosin-Rammlar formula was 1.1. The band gap calculated by the reflective index was 2.9 eV.

TABLE 1

| Items | Example | | | |
|---|---|---|---|---|
| | 1 | 2 | 3 | 4 |
| $D_{top}/D_{50}$ | 2.4 | 2 | 1.9 | 2.2 |
| Distribution constant n | 3.2 | 3.5 | 3.7 | 3.1 |
| Anatase content (%) | 95 | 91 | 95 | 90 |
| Chlorine content (mass %) | 0.12 | 0.13 | 0.14 | 0.08 |
| Fe Content (mass %) | <0.01 | <0.01 | <0.01 | <0.01 |
| Al Content (mass %) | <0.01 | <0.01 | <0.01 | <0.01 |
| Si Content (mass %) | <0.01 | <0.01 | <0.01 | <0.01 |
| S Content (mass %) | <0.01 | <0.01 | <0.01 | <0.01 |

| Items | Comparative Example | | | | |
|---|---|---|---|---|---|
| | 1 | 2 | 3 | 4 | 5 |
| $D_{top}/D_{50}$ | 3.4 | 3.9 | 3.3 | 4 | 3.3 |
| Distribution constant n | 2.5 | 2 | 1.9 | 1.5 | 1.3 |
| Anatase content (%) | 68 | 95 | 72 | 67 | 76 |
| Chlorine content (mass %) | 0.07 | 0.22 | 0.16 | 0.06 | 0.13 |
| Fe Content (mass %) | <0.01 | <0.01 | <0.01 | <0.01 | <0.01 |
| Al Content (mass %) | <0.01 | <0.01 | <0.01 | <0.01 | <0.01 |
| Si Content (mass %) | <0.01 | <0.01 | <0.01 | <0.01 | <0.01 |
| S Content (mass %) | <0.01 | <0.01 | <0.01 | <0.01 | <0.01 |

INDUSTRIAL APPLICABILITY

The titanium dioxide of the present invention is suitably used, for example, in a photocatalyst or a solar cell or as a dielectric material, a fuel cell catalyst support, and a while particulate for an electronic display and, in particular, as the dispersibility in an aqueous solvent is excellent, a grinding step or the like can be dispensed with or can be performed only by a very small facility, and the practical value in industry is very great.

The invention claimed is:

1. Titanium dioxide having a ratio $D_{top}/D_{50}$ of 1 to 3 between the maximum particle diameter $D_{top}$ and the average particle diameter $D_{50}$, wherein the $D_{top}$ and $D_{50}$ are determined based on observing the primary particles by a field emission-type scanning electron microscope, and wherein the $D_{50}$ is from 5 to 200 nm and the content of chlorine in the titanium dioxide is 0.001 mass % to 0.2 mass %.

2. The titanium dioxide according to claim 1, wherein the $D_{top}/D_{50}$ is from 1 to 2.

3. The titanium dioxide according to claim 1, wherein in the particle size distribution of primary particles observed by a field emission-type scanning electron microscope, the distribution constant n according to the following Rosin-Rammler formula is 3 or more:

$$R = 100\exp(-bD^n)$$

wherein D is a particle diameter, R is a percentage of the number of particles larger than D (particle diameter) based on the number of all particles, and n is a distribution constant.

4. A process for producing the titanium dioxide as set forth in claim 1, the process comprising performing a vapor phase process of reacting a titanium tetrachloride-containing gas with an oxidative gas to produce titanium dioxide, wherein when the titanium tetrachloride-containing gas and the oxidative gas are reacted by introducing each gas into a reaction tube, the temperature in the reaction tube being from 1,050 to less than 1,300° C., wherein in the synthesis of titanium dioxide by the vapor phase process, the titanium dioxide produced by the reaction of titanium tetrachloride with the oxidative gas stays in the reaction tube for an average residence time of 0.005 to 0.08 seconds, and wherein in the introduction of the titanium tetrachloride-containing gas and the oxidative gas into the reaction tube, the ratio (S1/S2) of the cross-sectional area (S1) of the reaction tube and the sum total (S2) of cross-sectional areas of the inlet tubes for the titanium tetrachloride-containing gas and the oxidative gas is from 1 to 2.5.

5. The production process of titanium dioxide according to claim 4, wherein the ratio S1/S2 is from 1 to 1.5.

6. The production process of titanium dioxide according to claim 4, wherein in the synthesis of titanium dioxide by the vapor phase process, the flow rate of each of the titanium tetrachloride-containing gas and the oxidative gas at the inlet part into the reaction tube is from 30 to 150 m/s.

7. The production process of titanium dioxide according to claim 4, wherein the titanium tetrachloride-containing gas and the oxidative gas each is preheated at 600° C. to less than 1,200° C. and then introduced into the reaction tube.

8. The production process of titanium dioxide according to claim 4, wherein a reaction is performed between a raw material gas prepared by mixing an inert gas at a ratio of 100 mol or less per mol of titanium tetrachloride and an oxidative gas in an amount of 1 to 150 equivalents per mol of titanium tetrachloride.

9. The production process of titanium dioxide according to claim 4, wherein the oxidative gas is a water vapor-containing oxygen gas.

10. The production process of titanium dioxide according to claim 9, wherein the oxidative gas contains 0.1 mol or more of water vapor per mol of oxygen gas.

11. The production process of titanium dioxide according to claim 4, wherein the titanium dioxide is dechlorinated by a dry dechlorination method to obtain titanium dioxide having a chlorine content of 0.2 mass % or less.

12. The production process of titanium dioxide according to claim 11, wherein the dry dechlorination method is a method of heating the titanium dioxide at 200 to 550° C.

13. The production process of titanium dioxide according to claim 11, wherein the dry dechlorination method is a method of heating a water vapor-containing gas at 200 to 1,000° C. while contacting the gas with the titanium dioxide.

14. The production process of titanium dioxide according to claim 12, wherein the dry dechlorination method is a method of heating a water vapor-containing gas and the amount of the water vapor is, in terms of mass ratio, 0.01 to 1 based on the titanium dioxide.

15. The production process of titanium dioxide according to claim 13, wherein the water vapor-containing gas is an air containing 0.1 vol % or more of water vapor.

16. The production process of titanium dioxide according to claim 11, wherein in the dry dechlorination method, the dechlorination of the titanium dioxide is performed in a vessel under reduced pressure.

17. The production process of titanium dioxide according to claim 16, wherein the pressure reduction degree inside the vessel under reduced pressure is 0.5 kPa or more.

* * * * *